United States Patent
Talathi et al.

(10) Patent No.: US 10,275,719 B2
(45) Date of Patent: Apr. 30, 2019

(54) HYPER-PARAMETER SELECTION FOR DEEP CONVOLUTIONAL NETWORKS

(71) Applicant: QUALCOMM Incorporated, San Diego, CA (US)

(72) Inventors: Sachin Subhash Talathi, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 793 days.

(21) Appl. No.: 14/848,296

(22) Filed: Sep. 8, 2015

(65) Prior Publication Data

US 2016/0224903 A1 Aug. 4, 2016

Related U.S. Application Data

(60) Provisional application No. 62/109,470, filed on Jan. 29, 2015.

(51) Int. Cl.
   *G06N 20/00* (2019.01)
   *G06N 3/08* (2006.01)
   *G06N 7/00* (2006.01)

(52) U.S. Cl.
   CPC .............. *G06N 20/00* (2019.01); *G06N 3/08* (2013.01); *G06N 3/082* (2013.01); *G06N 7/005* (2013.01)

(58) Field of Classification Search
   None
   See application file for complete search history.

(56) References Cited

U.S. PATENT DOCUMENTS

| | | | |
|---|---|---|---|
| 2008/0162386 A1* | 7/2008 | Rifkin | G06N 7/005 706/12 |
| 2014/0278424 A1 | 9/2014 | Deng et al. | |
| 2014/0344193 A1 | 11/2014 | Bilenko et al. | |
| 2014/0358546 A1 | 12/2014 | Fernandez et al. | |
| 2015/0100530 A1 | 4/2015 | Mnih et al. | |
| 2015/0149165 A1 | 5/2015 | Saon | |

OTHER PUBLICATIONS

'Scalable Automated Model Search': Sparks, 2014, Electrical Engineering and Computer Sciences University of California at Berkeley.*

(Continued)

*Primary Examiner* — Robert A Cassity
*Assistant Examiner* — Peter D Coughlan
(74) *Attorney, Agent, or Firm* — Seyfarth Shaw LLP

(57) ABSTRACT

Hyper-parameters are selected for training a deep convolutional network by selecting a number of network architectures as part of a database. Each of the network architectures includes one or more local logistic regression layer and is trained to generate a corresponding validation error that is stored in the database. A threshold error for identifying a good set of network architectures and a bad set of network architectures may be estimated based on validation errors in the database. The method also includes choosing a next potential hyper-parameter, corresponding to a next network architecture, based on a metric that is a function of the good set of network architectures. The method further includes selecting a network architecture, from among next network architectures, with a lowest validation error.

20 Claims, 10 Drawing Sheets

(56) References Cited

OTHER PUBLICATIONS

'Auto-WEKA: Combined Selection and Hyperparameter Optimization of Supervised Machine Learning Algorithms':: Thornton, 2011, University of British Columbia.*

Bergstra, J.S., et al., "Making a Science of Model Search: Hyperparameter Optimization in Hundreds of Dimensions for Vision Architectures," JMLR Workshop and Conference Proceedings, Feb. 15, 2013, vol. 28 (1), pp. 115-123, XP055253677, ISSN: 1938-7228, Sections 2-5.

Eggensperger, K., et al., "Towards an Empirical Foundation for Assessing Bayesian Optimization of Hyperparameters," Proceedings of NIPS '26 workshop on Bayesian Optimization in Theory and Practice (BayesOpt 13), Dec. 10, 2013 (Dec. 10, 2013), XP055253741, Retrieved from the Internet: URL: http://www.cs.ubc.ca/'hutter/papers/13-BayesOpt_EmpiricalFoundation.pdf [retrieved on Oct. 16, 2013] sections 1-3.

International Search Report and Written Opinion—PCT/US2015/065327—ISA/EPO—dated Mar. 24, 2016.

Jarrett, K., et al., "What is the Best Multi-Stage Architecture for Object Recognition?" Proceedings of the 12th International Conference on Computer Vision (ICCV '09), Sep. 29, 2009, pp. 2146-2153, XP031672799, DOI: 10.1109/ICCV.2009.5459469, Sections 2 and 4.

Li, Z.Z., et al., "Identifying Best Hyperparameters for Deep Architectures using Random Forests," Proceedings of the 9th International Conference on Leading and Intelligent Optimization (LION '9), In Lecture Notes in Computer Science, Jan. 12, 2015, vol. 8994, pp. 29-42, XP055253931, DOI: 10.1007/978-3-319-19084-6_4, Sections 1, 2 and 4.5.

Swersky, K., et al., "Raiders of the Lost Architecture: Kernels for Bayesian Optimization in Conditional Parameter Spaces," Proceedings of NIPS '2 Workshop on Bayesian Optimization in Theory and Practice (BayesOpt '13), Dec. 10, 2013, XP055253743, Retrieved from the Internet: URL: http://www.cs.toronto.edu/'kswersky/wp-content/uploads/hier-kem-workshop.pdf [retrieved on Dec. 5, 2013] sections 1-3.

* cited by examiner

HYPER-PARAMETER SELECTION FOR DEEP CONVOLUTIONAL NETWORKS

CROSS-REFERENCE TO RELATED APPLICATION

The present application claims the benefit of U.S. Provisional Patent Application No. 62/109,470, filed on Jan. 29, 2015, and titled "HYPER-PARAMETER SELECTION FOR DEEP CONVOLUTIONAL NETWORKS," the disclosure of which is expressly incorporated by reference herein in its entirety.

BACKGROUND

Field

Certain aspects of the present disclosure generally relate to machine learning and, more particularly, to improving systems and methods of selecting hyper-parameters for deep convolutional networks.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect, a method of selecting hyper-parameters for training a deep convolutional network is presented. The method includes selecting a number of network architectures as part of a database. Each of the network architectures includes one or more local logistic regression layers and is trained to generate a corresponding validation error that is stored in the database. A threshold error for identifying a good set of network architectures and a bad set of network architectures may be estimated based on validation errors in the database. The method also includes choosing a next potential hyper-parameter, corresponding to a next network architecture, based on a metric that is a function of the good set of network architectures. The method further includes selecting a network architecture, from among next network architectures, with a lowest validation error.

In another aspect, an apparatus for selecting hyper-parameters for training a deep convolutional network is presented. The apparatus includes a memory and at least one processor coupled to the memory. The one or more processors are configured to select a number of network architectures as part of a database. Each of the network architectures includes one or more local logistic regression layers and is trained to generate a corresponding validation error that is stored in the database. The processor(s) are also configured to estimate a threshold error for identifying a good set of network architectures and a bad set of network architectures based on validation errors in the database. The processor(s) are also configured to choose a next potential hyper-parameter, corresponding to a next network architecture, based on a metric that is a function of the good set of network architectures. The processor(s) are further configured to select a network architecture, from among next network architectures, with a lowest validation error.

In yet another aspect, an apparatus for selecting hyper-parameters for training a deep convolutional network is presented. The apparatus includes means for selecting a number of network architectures as part of a database. Each of the network architectures includes one or more local logistic regression layer. The apparatus also includes means for training each of the network architectures to generate a corresponding validation error that is stored in the database. The apparatus further includes means for estimating a threshold error for identifying a good set of network architectures and a bad set of network architectures based on validation errors in the database. The apparatus additionally includes means for choosing a next potential hyper-parameter, corresponding to a next network architecture, based on a metric that is a function of the good set of network architectures. Furthermore, the apparatus includes means for selecting a network architecture, from among next network architectures, with a lowest validation error.

In still another aspect, a non-transitory computer-readable medium is presented. The non-transitory computer-readable medium has program code encoded thereon for selecting hyper-parameters for training a deep convolutional network. The program code is executed by a processor and includes program code to select a number of network architectures as part of a database. Each of the network architectures includes one or more local logistic regression layers and is trained to generate a corresponding validation error that is stored in the database. The program code also includes program code to estimate a threshold error for identifying a good set of network architectures and a bad set of network architectures based on validation errors in the database. The program code further includes program code to choose a next potential hyper-parameter, corresponding to a next network architecture, based on a metric that is a function of the good set of network architectures. Furthermore, the program code includes program code to select a network architecture, from among next network architectures, with a lowest validation error.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
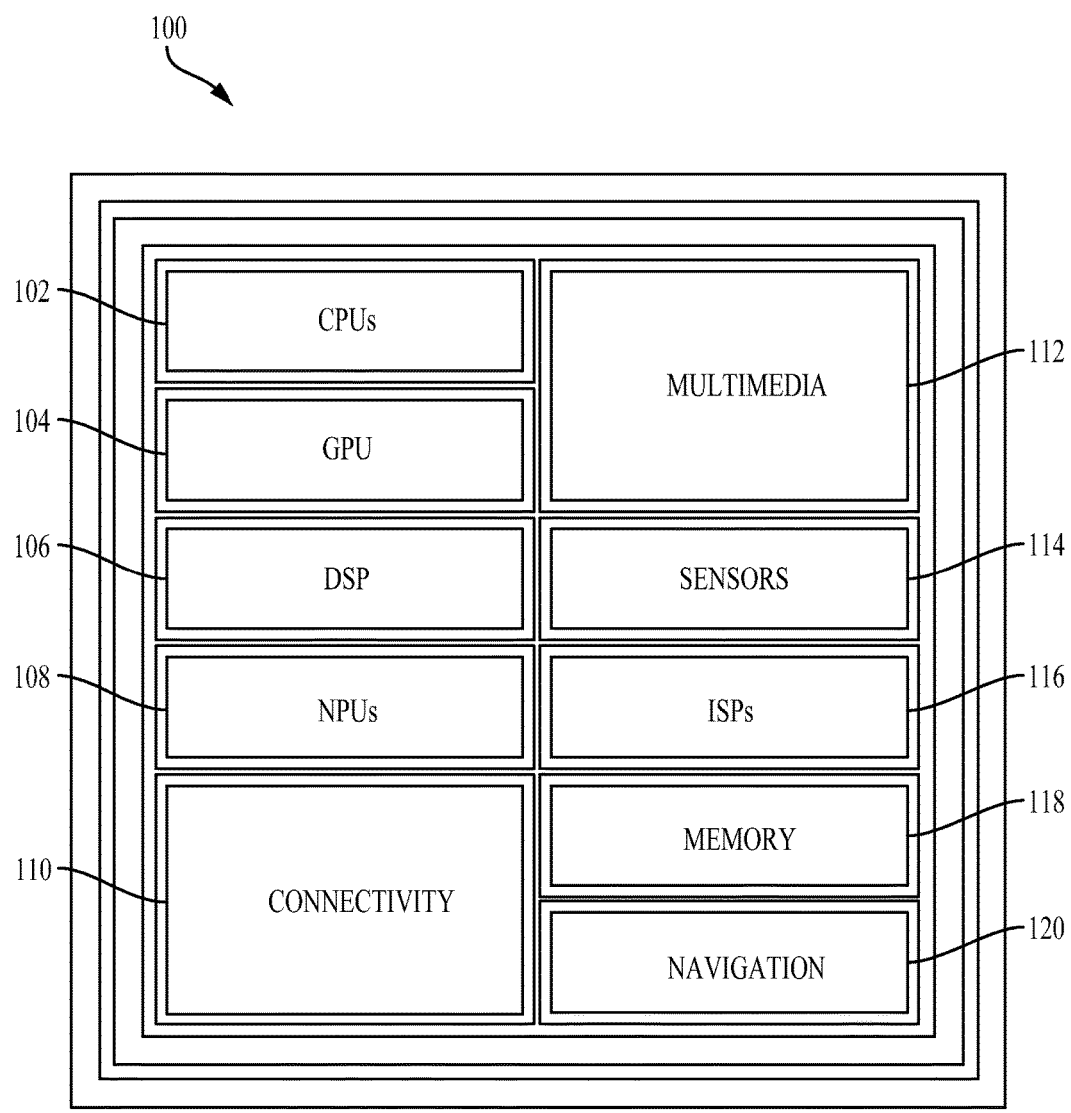
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Hyper-Parameter Selection

Neural networks, such as deep convolutional networks (DCNs), may be configured as serial networks comprising a series of convolution layers, a normalization layer, and pooling blocks, followed by a series of fully connected hidden layers, followed by a logistic regression cost function layer. As the depth of the network increases, however, it has been observed that training of DCNs is difficult, primarily suffering from a vanishing gradient problem at larger depths. To address this problem, the architecture and/or learning parameters of the DCN may be modified to facilitate training. For example, the DCN may be modified such that each layer of the DCN is forced to learn the mapping x→y locally, by introducing a logistic regression cost function at the output of each convolution block.

In accordance with aspects of the present disclosure, architecture hyper-parameters and/or learning hyper-parameters may be selected to facilitate training a neural network, such as a deep convolutional network (DCN). Hyper-parameters include architectural parameters, which describe the neural network, as well as learning parameters used for training the neural network via a training process such as back propagation.

In one exemplary aspect, the neural network may comprise a DCN. The DCN model may be represented by $M_\lambda(x, w)$. The DCN model may operate on input data $x \in \mathbb{R}^D$ and generate an estimate $\hat{y}$ for the output data $y \in \mathbb{Z}_2^C$. The DCN model M may be parameterized, for example, using two sets of parameters. Of course, greater or fewer parameters may also be used according to design preference. The first parameter w, may be obtained using a training criterion, C. The second parameter $\lambda = \{\lambda_l, \lambda_a\}$, includes a set of parameters, which may be referred to as hyper-parameters. The hyper-parameters define the DCN network architecture ($\lambda_a$) or the parameters associated with the learning process ($\lambda_l$) used for the improvement of the training criterion C. The set of hyper-parameters, $\lambda$, for a DCN network that is trained using a gradient descent type learning process such as a back propagation learning process may include, but are not limited to:

Hyper-Parameters Associated with DCN Architecture Design
 1. Number of convolution layers
 2. Number of fully connected hidden layers
 3. For each convolution layer:
  Boolean variable for presence or absence of local response normalization layer
  Boolean variable for presence or absence of pooling layer
  Number of filters
  Filter size
  Stride
  Padding
 4. For each pooling layer:
  Size
  Stride
 5. For each normalization layer:
  Size
  Scale
  Power
 6. For each fully connected hidden layer:
  Number of hidden nodes
  Boolean variable for presence or absence of dropout
  Dropout value Hyper-Parameters Associated with the DCN Learning Process
 1. Learning parameters for weight updates
 2. Momentum parameters for weight updates
 3. Regularization parameter
 4. Number of training epochs
 5. Size of mini batches
 6. Cooling strategy: for the sake of clarity one exemplary cooling strategy may provide that as the training progresses, the learning rate is scaled by a factor alpha <1. As the learning rate is cooled, the fluctuations in the weight update values are smaller and the likelihood of the solution converging to a given local minima is higher.

One objective for DCN hyper-parameter selection is to solve the joint selection problem as stated below:

$$\{w, \lambda\} = \underset{\lambda}{\operatorname{argmin}} [\Psi(\hat{y}_h, y_g)] \text{ where} \quad (1)$$

$$\hat{y}_h = M_\lambda \left( \underset{\theta}{\operatorname{argmin}} (C(x_{tr}, y_{tr}, \theta)), x_h \right),$$

where $\{(x_{tr}, y_{tr}), (x_h, y_h)\} \in (x,y)$, are the input and output training and hold-out (or the test or validation) data set respectively, $\Psi = \Sigma_{\{yh\}} \mathbb{I}_{y_h \neq \hat{y}_h}$.

In some aspects, a Bayesian approach may be employed to solve the hyper-parameter selection problem. In one example, a database $D_{1:t} = \{\lambda_{1:t}, e_{1:t}\}$ may comprise T DCN models, where $\lambda_i|_{i=1}^t$ represents the set of hyper-parameters and $e_i|_{i=1}^t$ represents the error on the validation (e.g., hold-out) data set for each of the $i=1 \ldots t$ DCN models. Under the Bayesian approach, a prior probability of error p(e) one may be assigned. The database may then be used to obtain an estimate for the likelihood function $p((D_{1:t}|e))$ which may provide the probability of a given architecture in the database for a given validation error. The prior and the likelihood function may, in turn, be used to obtain an estimate for the posterior distribution, which may be given by $p(e|D_{1:t}) \propto p(D_{1:t}|e)p(e)$, where the estimated posterior distribution is proportional to the product of the probability of an architecture for a given error and the probability of error.

The next potential hyper-parameter may then be determined. Samples $\lambda_{t+1}$ and $e_{t+1}$ may be obtained by increasing the expectation of a utility function u(e) with respect to the posterior distribution on the objective function e. One key idea underlying the Bayesian approach strategy as outlined above is that optimizing the expected value of the utility function is much cheaper and computationally faster than solving the original problem of selecting $\psi$, as stated in Eq. 1.

In some aspects, the utility function may be the expected improvement (EI) function. Of course, other the utility functions may also be used. For example, the utility function may be the Probability of Improvement. The Probability of Improvement focuses on the likelihood of whether a given exploration point, x, will offer an improvement in score. e.g., u(e)=P(e*>e)=\phi((e*-mu(x)/sigma(x)); where \phi is the normal cumulative distribution function.

The expected improvement utility function may be given by u(e)=max((e*-e), 0) and may be used for selecting a model from the set, where e* is an error threshold. The objective under the Bayesian approach is then to choose a next hyper-parameter $\lambda_{t+1}$ that maximizes the expected improvement u(e) under the probability distribution $p(e|D_{1:t})$ or in other words $$\lambda_{t+1} = \underset{\lambda}{\operatorname{argmax}} [E(u(e))]$$

where E(u(e)) is given as:

$$E(u(e)) = \int u(e) p(e|D_{1:t}) de \quad (2)$$
$$= \int u(e) \frac{p(D_{i:t}|e)p(e)}{p(D_{i:t})} de$$

Using an expected improvement utility function u(e)=max((e*-e), 0) a prior, p(e), may be defined such that $P(e^*) = \int_{-\infty}^{e^*} p(e) de = \gamma$, where $\gamma$ is a constant with $l(\lambda) = p(D_{1:t}|e<e^*)$ representing the models in the database having a low error (below the error threshold (e*) which may be referred to herein as good models) and $g(\lambda) = p(D_{1:t}|e \geq e^*)$ representing the models in the database having a higher error (above the error threshold (e*) which may be referred to herein as bad models). Accordingly, an estimate for the expected utility function E(u(e)) may be obtained using the relationship $E(u(e)) \propto 1/(\gamma + (1-\gamma)g(\lambda)/l(\lambda))$. In some aspects, where the set of models is a constant such that the sum of the number of good models and the number of bad models ($l(\lambda) + g(\lambda) = U(\lambda)$) is a constant or where $\lambda$ is drawn from a uniform distribution, the estimate for the expected utility function may be further simplified and given by $E(u(e)) \propto l(\lambda)$ when $\gamma = 0.5$.

From these equations, one goal for DCN hyper-parameter selection is then to choose the next hyper-parameter ($\lambda_{t+1}$) from the distribution of hyper-parameters corresponding to the set of good models ($\lambda_{1:t} \in l(\lambda)$) that produces the largest ratio of good models to bad models ($l(\lambda)/g(\lambda)$), where $l(\lambda)$ are models in the set with low error (below the error threshold (e*)—good models) and g(λ) are models in the set with higher error (above the error threshold (e*)—bad models).

In some aspects, the next hyper-parameter $\lambda_{t+1}$ may be chosen from $\lambda_{1:t} \in U(\lambda)$ that produces the model with the lowest error or a largest value for l(λ).

FIG. 1 illustrates an example implementation of the aforementioned hyper-parameter selection using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for selecting a number of network architectures as part of a database. Each of the architectures may include one or more local logistic regression layers. The instructions loaded into the general-purpose processor 102 may also comprise code for training each architecture to generate a corresponding validation error that is stored in the database. The instructions loaded into the general-purpose processor 102 may further comprise code for estimating a threshold error for identifying a good set of architectures and a bad set of architectures based on the validation errors in the database. Additionally, the instructions loaded into the general-purpose processor 102 may comprise code for choosing a next potential hyper-parameter, corresponding to a next architecture, based on a metric that is a function of the good architectures. Furthermore, the instructions loaded into the general-purpose processor 102 may comprise code for selecting an architecture, from among next architectures, with a lowest validation error.

Figure 2:
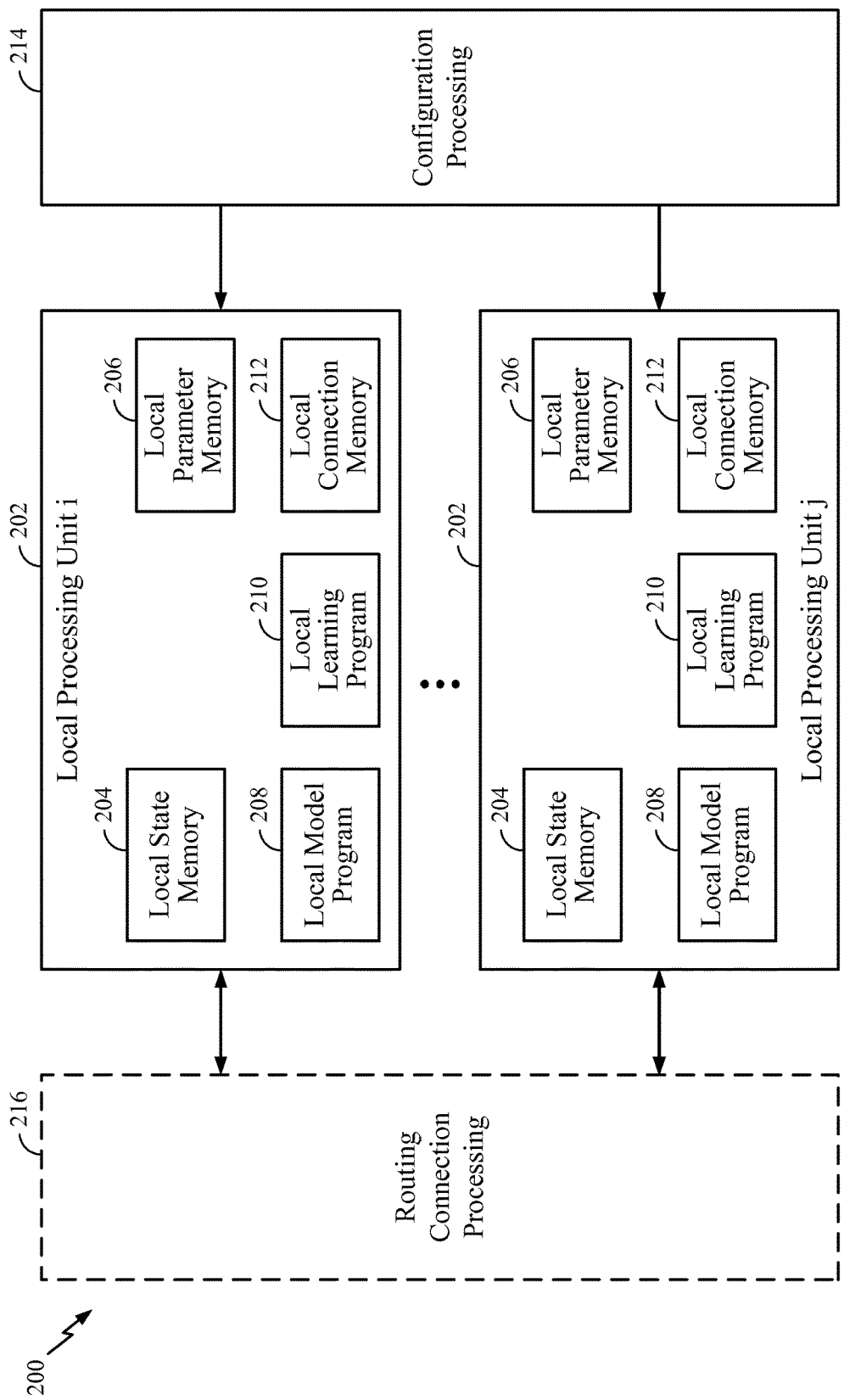
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
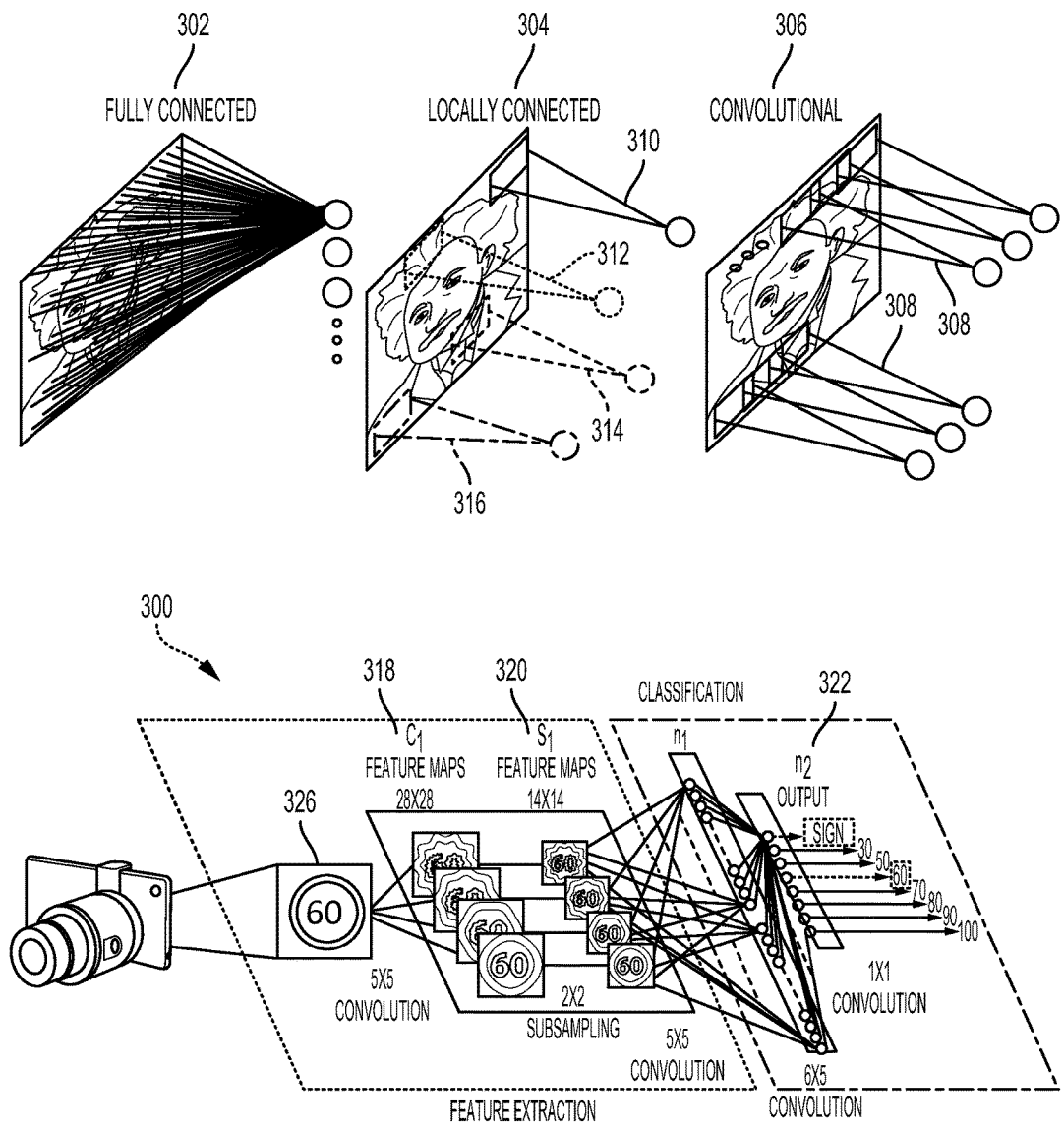
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
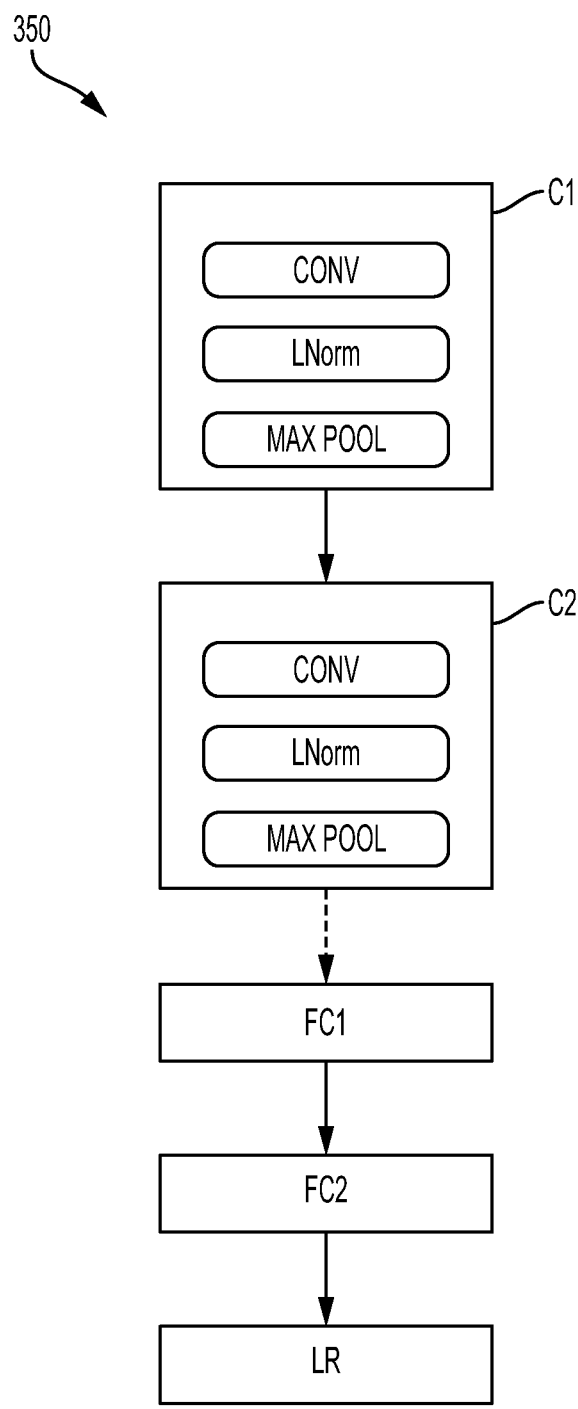
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 3C:
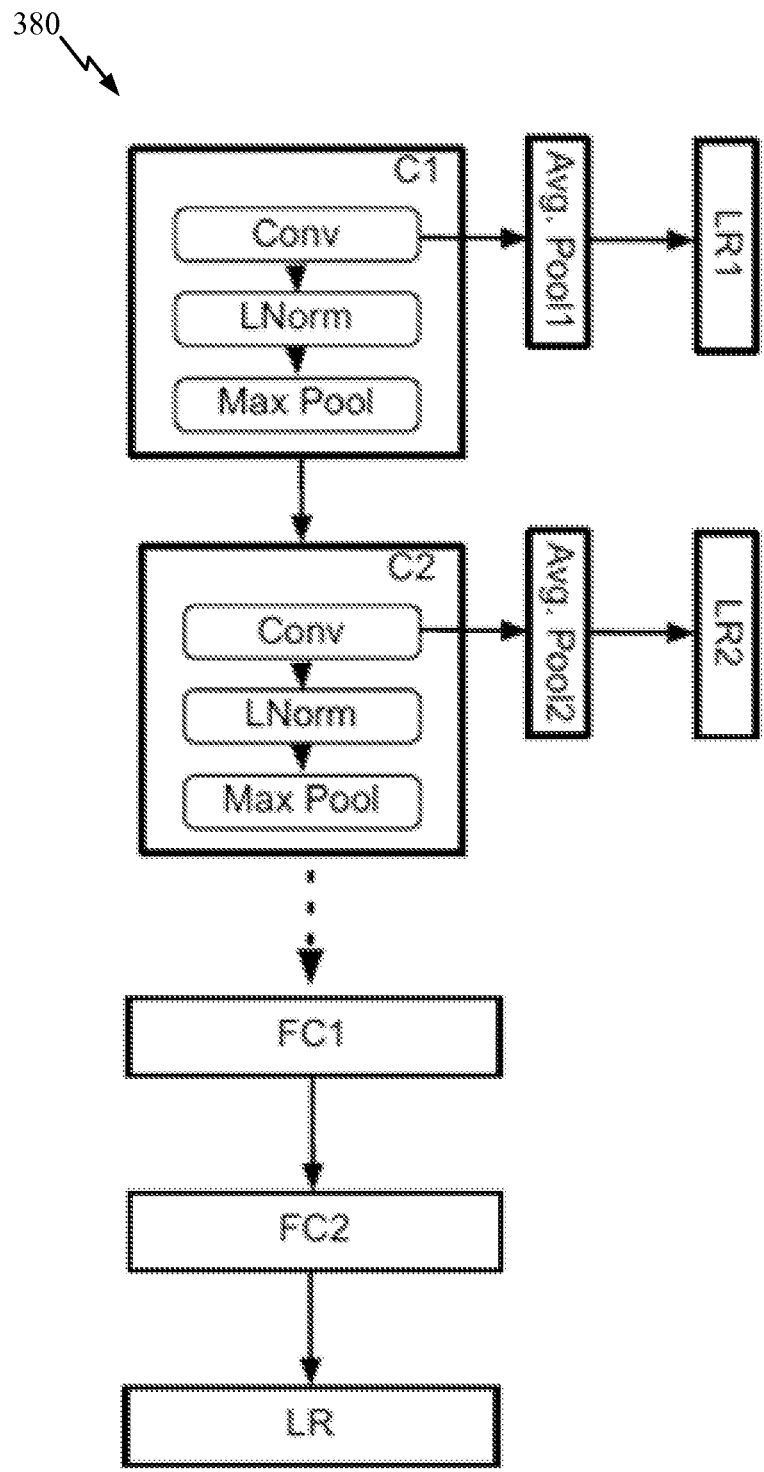
FIG. 3C is a block diagram illustrating an enhanced deep convolutional network (DCN) in accordance with aspects of the present disclosure.

FIG. 3C is a block diagram illustrating an enhanced DCN 380 in accordance with aspects of the present disclosure. As indicated herein, architecture and/or learning parameters of a neural network (e.g., DCN 350) may be modified to facilitate training FIG. 3C illustrates the DCN 380, which has modified architecture in comparison to the DCN 350. As shown in FIG. 3C, the output of the convolution layer may be supplied to an average pooling layer of a size equal to the input image size, which then synapses onto a local logistic regression cost function layer (e.g., LR1 and LR2). By adding a local logistic regression layer to each block, each block is enabled to update its own weights. In other words, the model does not have to wait until the bottom of the network to update weights. This modification may increase the speed of computation to further facilitate training of the DCN. In this way, the impact of vanishing gradient problems may be reduced.

Figure 4:
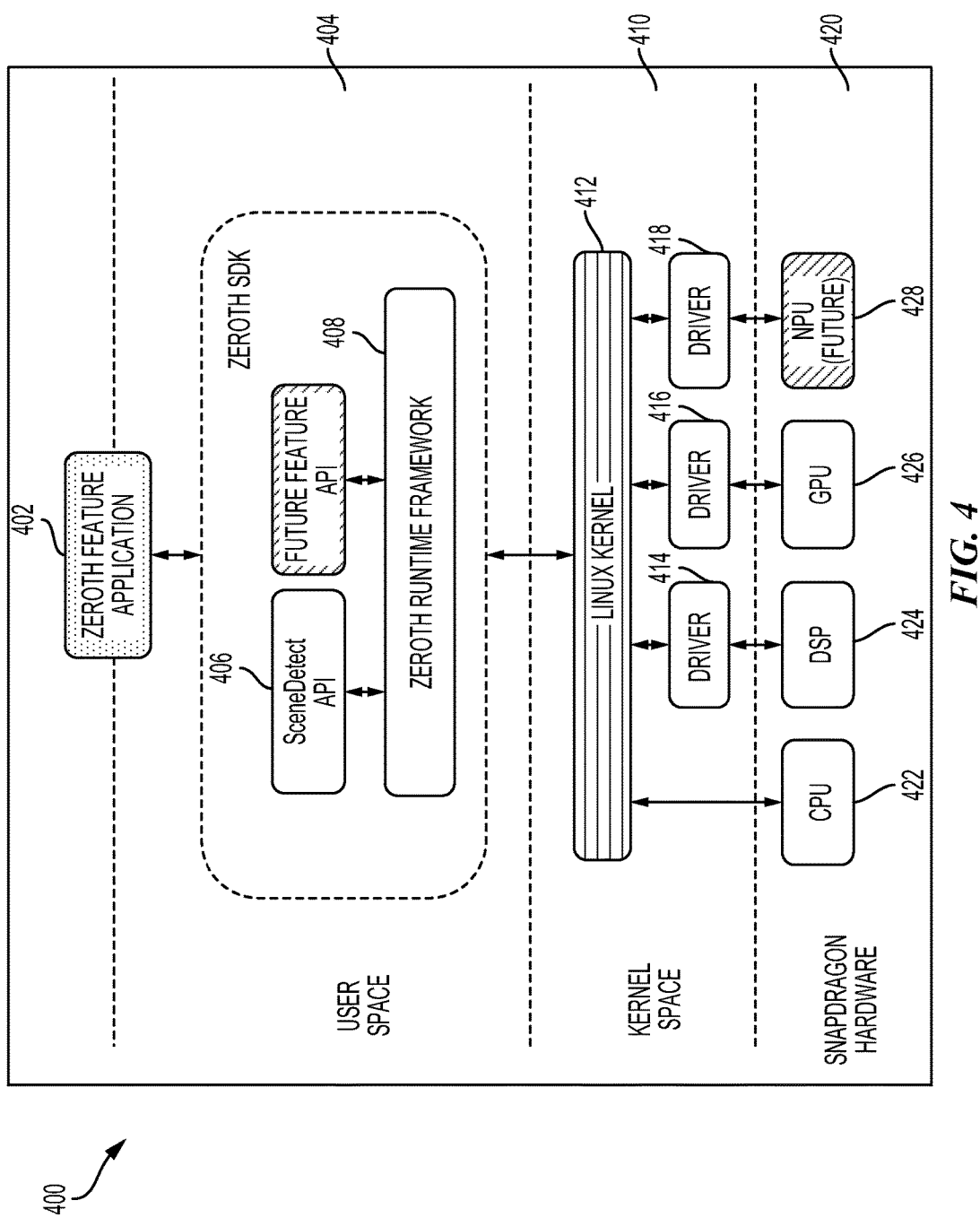
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
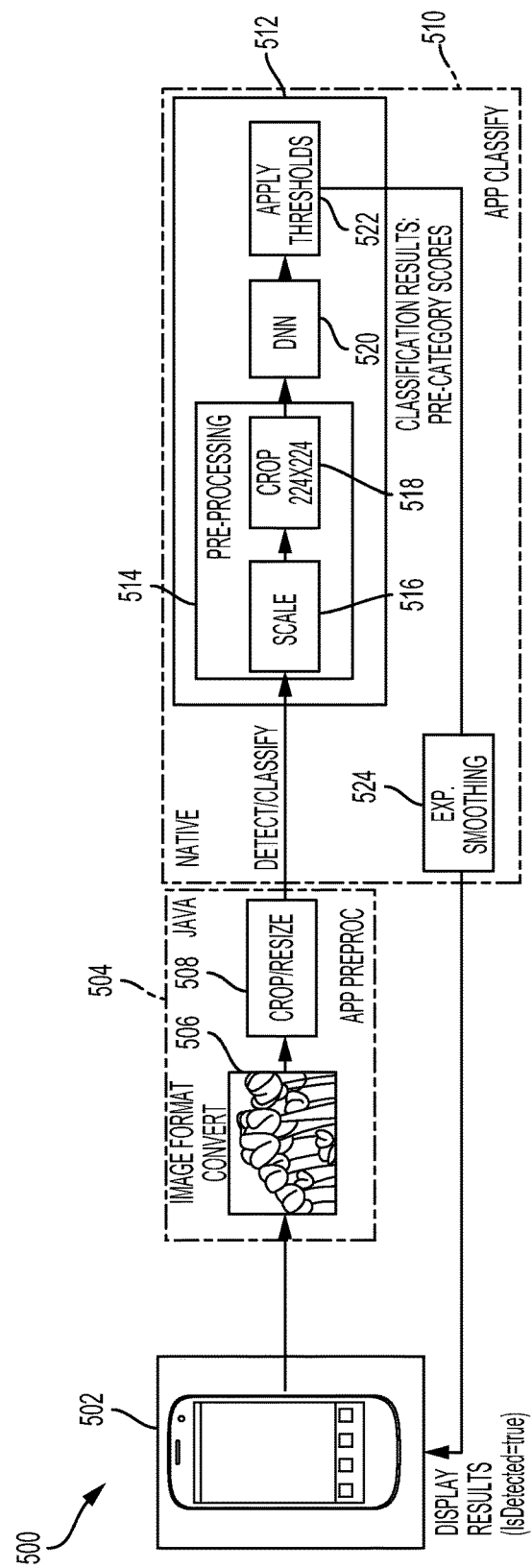
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model, such as a deep convolutional network, is configured for selecting a number of network architectures as part of a database. The model is also configured for training each architecture to generate a corresponding validation error that is stored in the database and estimating a threshold error for identifying a good set of architectures and a bad set of architectures based on the validation errors in the database. The model is further configure for choosing a next potential hyper-parameter, corresponding to a next architecture, based at least in part on a metric that is a function of the good architectures; and selecting an architecture, from among next architectures.

The model includes means for selecting a number of architectures, training means, estimating means, choosing means and/or means for selecting an architecture. In one aspect, the means for selecting a number of architectures, training means, estimating means, choosing means and/or means for selecting an architecture may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the machine network based upon desired one or more functional features of the network, and develop the one or more functional features towards the desired functional features as the determined parameters are further adapted, tuned and updated.

Figure 6:
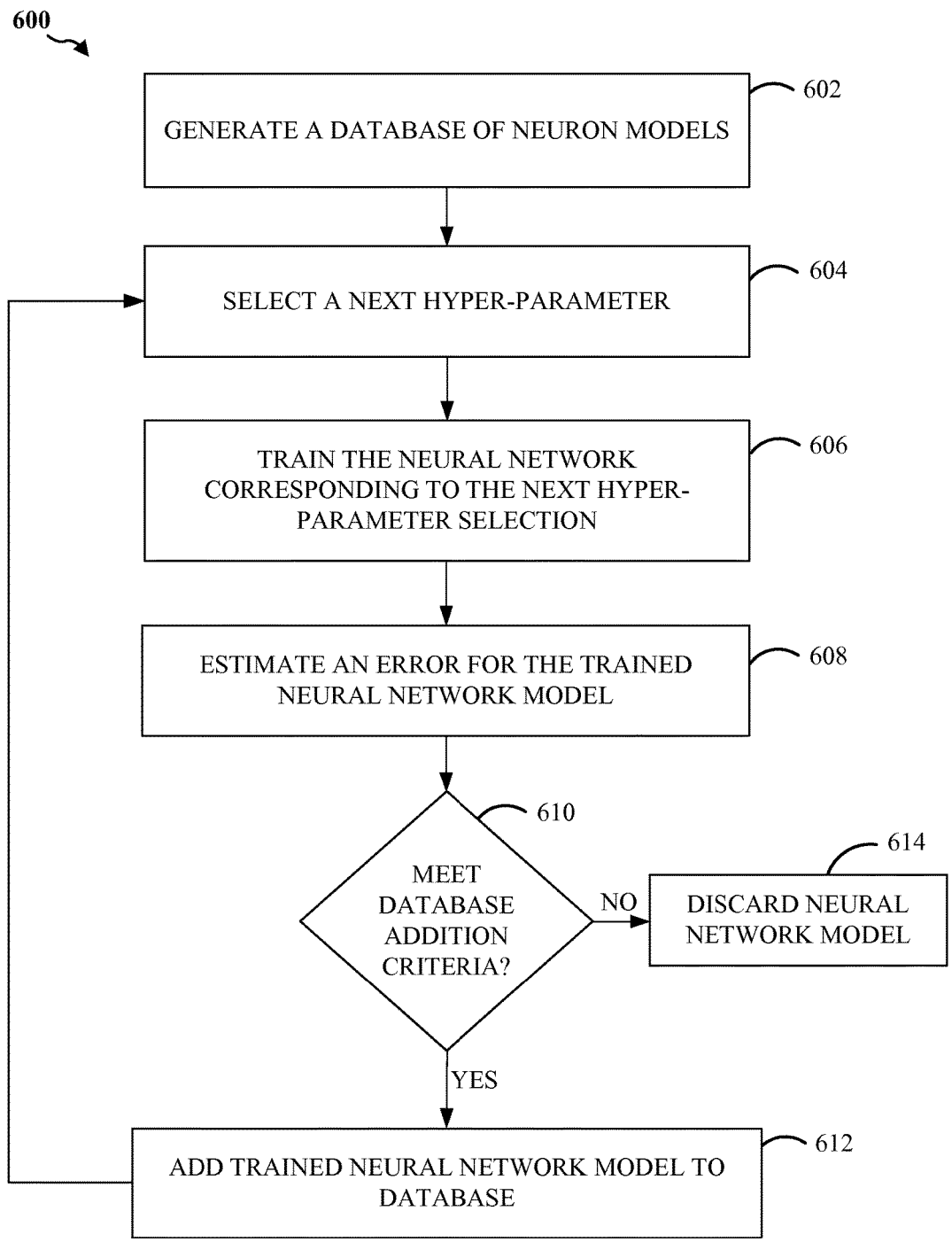
FIG. 6 is a block diagram illustrating a method of selecting hyper-parameters for training a deep convolutional network in accordance with aspects of the present disclosure.

FIG. 6 is a block diagram illustrating a method 600 of selecting hyper-parameters for training a deep convolutional network in accordance with aspects of the present disclosure. In block 602, the process generates a database of neuron models (e.g., DCN). For each neuron model included in the database, a hyper-parameter and error (e.g., validation error) may be specified. In block 604, the process may select the next hyper-parameter ($\lambda_{t+1}$). The next hyper-parameter may be chosen to maximize the expected utility function $E(u(e))$. In some aspects, the next hyper-parameter may be selected based on the ratio of good models (models for which error is below the error threshold) in the database to bad models (models for which error is above the error threshold) in the database $l(\lambda)/g(\lambda)$, the good models alone, or other selection criteria.

In block 606, the process may train the neural network corresponding to the next-hyper-parameter selection. The neural network may be trained using a gradient descent type learning process or other training process. In block 608, the process may estimate an error for the neural network model, for example, using a validation, hold-out, test or other data set. In block 610, the process determines whether to the new model meets database addition criteria. The database addition criteria may include an error threshold. The database error threshold may comprise error threshold e* or a second error threshold. For example, the neuron model may meet the database addition criteria if the estimated error is below the error threshold.

The second error threshold may, for instance, be based on the highest estimated error for models in the database. In another example, the second error threshold may be based on the highest estimated error for the good models in the database. Of course, different and/or additional database addition criteria may be used to determine whether to add the neural network model according to design preference and storage considerations.

If the neural network model meets the criteria, the new network model may be added to the database in block 612. Otherwise, the neural network model may be discarded at block 614. Thereafter, the process may return to block 604 to select the next hyper-parameter.

Selecting the Database $D_{1:t}$ of DCN Models

In some aspects, the number of models t may be chosen based on data from a random search. In one example, M random DCN network topologies may be generated. The value M may be selected such that $\langle e_{1:M} \rangle - \langle e_{1:M+\in} \rangle \leq \delta$, $\in=25$, $\delta=0.05$, or using other suitable methods, for example. An experimental trial of size T may be selected. For example, a trial that contains a subset T≤number of random DCN network architectures may be used. From the M random DCN network topologies, a total of $E_T=\lfloor M/T \rfloor$ experimental trials may be generated. For a given experimental trial j of size T, j=1 ... $E_T$, the most accurate network (e.g., that produces the highest test accuracy $a_j^T$) may be identified. Accordingly, t may be selected (t=T) such that $\forall j \in E_T$, $a_j$ is greater than the upper boundary of the 95% confidence interval of the distribution for $\{a\}_1^M$.

Figure 7:
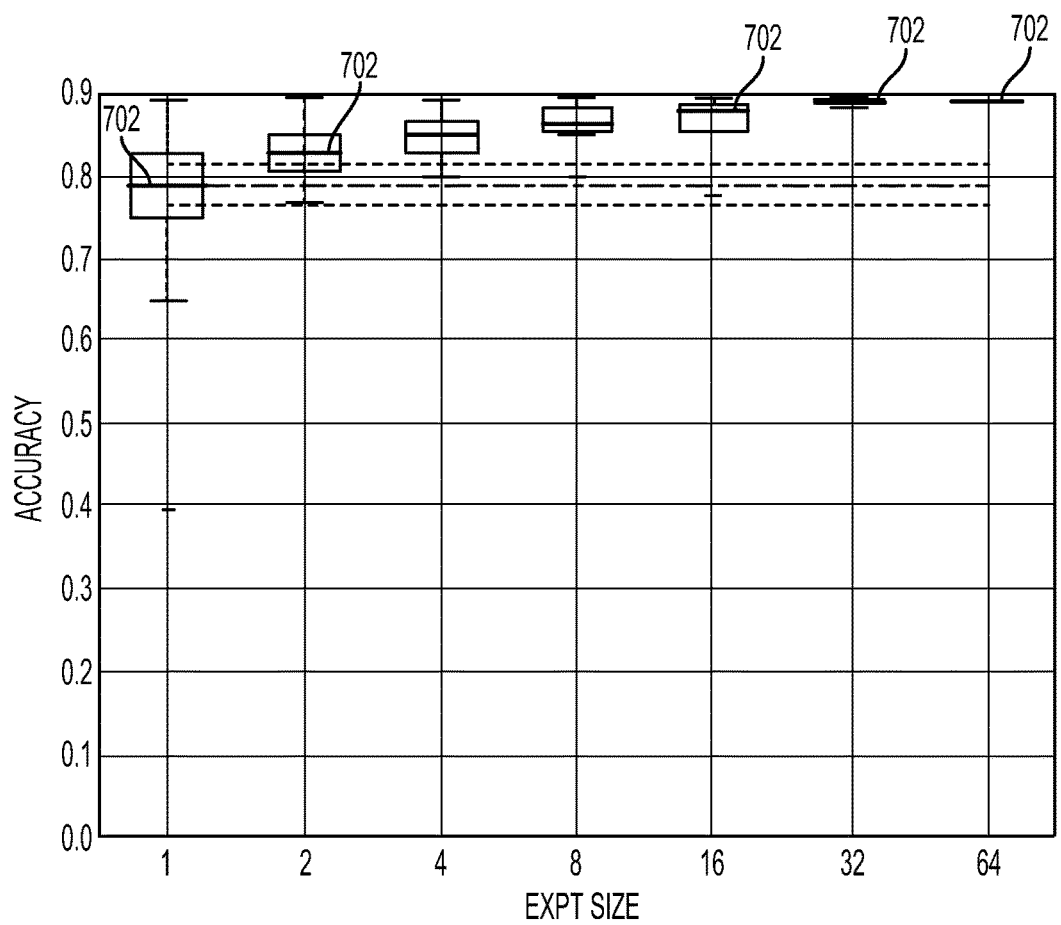
FIG. 7 is a graph illustrating an example random search efficiency curve.

FIG. 7 is a graph illustrating an example random search efficiency curve. In the example of FIG. 7, 128 random DCN architectures are trained and divided into sets. A box plot is provided for each set of DCN architectures to illustrate the distribution for the most accurate DCN architectures. The X-axis represents the experiment size while the Y-axis represents the accuracy. The box plot shows the error for a given set of DCNs. The solid line (e.g., 702) in each box provides the mean error for the corresponding set of DCNs. Accordingly, the sets of DCNs may be evaluated to determine the minimum number t of DCNs in the database to provide at least one good architecture (e.g., an architecture for which the error is below the threshold).

Selecting the Next Hyper-Parameter $\lambda_{t+1}$

In some aspects, the next hyper-parameter in the series may be selected. For a given choice of $\gamma<1$, an empirical distribution of $e_{1:t}$ may be used to estimate the error threshold e*. The set of t DCN models in the database may be partitioned or divided into two sets, the set L containing DCN models for which e<e* (e.g., good models) and the set G, containing the remainder of the DCN models (e.g., bad models). The distribution of hyper-parameters chosen from DCN models in L may be represented by $l(\lambda)$, and $g(\lambda)$ may represent the distribution of hyper-parameters chosen from DCN models in G.

Exemplary Solution 1

In one exemplary aspect, a set t of DCN architectures may be randomly generated, in which $\lambda_i$, i=1 ... t, is selected from the empirical distribution $l(\lambda)$. Choose $$\lambda_{t+1} = \underset{\lambda_i}{\mathrm{argmax}} \, [l(\lambda_i)].$$

This approach may be useful in exploring the space of DCN hyper-parameters around architectures that produce high accuracy outputs on the hold-out data set, for example. The next architecture is selected from the good set with the architecture's highest value within the good set.

Exemplary Solution 2

In another exemplary aspect, the search space of hyper-parameters may be constrained. In this example, a set t of DCN architectures may be randomly generated, in which $\lambda_j$ is selected from the empirical distribution $l(\lambda)$. For each DCN network j, j=1 ... t, evaluate $R(\lambda_j)=l(\lambda_j)/g(\lambda_j)$. Choose $$\lambda_{t+1} = \underset{\lambda_i}{\mathrm{argmax}} \, [R(\lambda_i)].$$

As such, this approach explores a limited space of hyper-parameters and may produce a converging solution sooner than in the preceding example. This example also evaluates based on a ratio, rather than just the good set of architectures.

Exemplary Solution 3

In yet another exemplary aspect, a set t of DCN architectures may be randomly generated. For each DCN network j, j=1 ... t, evaluate $R(\lambda_j)=l(\lambda_j)/g(\lambda_j)$. Choose $$\lambda_{t+1} = \operatorname*{argmax}_{\lambda_i} [R(\lambda_i)].$$

This approach may be used to explore architectures over a much larger space of hyper-parameters. In this approach, the selection is from an arbitrary random distribution instead of the good distribution. In some aspects, the selection may be based on the ratio.

Exemplary Solution 4

In a further exemplary aspect, a set t of DCN architectures may be randomly generated. For each DCN network j, j=1 ... t, evaluate $R(\lambda_j)=l(\lambda_j)$. Choose $$\lambda_{t+1} = \operatorname*{argmax}_{\lambda_i} [R(\lambda_i)].$$

In this example λ may be chosen from uniform random distribution. This approach may also result in exploration of a much larger space of hyper-parameters, with higher likelihood of hitting a λ where the network will provide enhanced performance. In this approach, the selection is from an arbitrary random distribution instead of the good distribution. The selection may also be based on the good set of architectures.

In another aspect, a hybrid strategy may be employed, where at any given time t, the next hyper-parameter in the series, $\lambda_{t+1}$, is chosen in accordance with any of the previous four solutions with some predetermined probability p{j}, where j={each of the four exemplary solutions above}. For example, the first solution could be selected 10% of the time, the second solution could be selected 40% of the time, the third solution selected 30% of the time and the fourth solution selected 20% of the time.

In some aspects, the hyper-parameters λ may be selected from a given database. For example, λ may be selected as follows:
1. Choose λ from empirical distribution of $\lambda \in l(\lambda)$.
2. Choose λ from empirical distribution of $\lambda \in l(\lambda)$ with a prior, to account for cases where a given data point in the empirical distribution of λ is not sampled.
3. Choose λ from a mixture of Gaussian fit to the distribution of $\lambda \in l(\lambda)$.
4. Choose λ from a uniform random distribution.

In some aspects, the hyper-parameters may be selected by searching over the space of λ. As indicated above, the hyper-parameters for training DCNs can be divided into two categories: $\lambda=\{\lambda_a,\lambda_l\}$, where $\lambda_a$ are the set of hyper-parameters associated with the DCN architecture and $\lambda_l$ are the hyper-parameters associated with the learning process used to train the DCN. Two of the possible schemes for selecting hyper-parameters are as follows:

1. Joint hyper-parameter selection: perform joint selection of $\lambda_l$ and $\lambda_a$.
2. Serial hyper-parameter selection: separate the hyper-parameter selection problem into two parts. For a given $\lambda_l$, first select architecture hyper-parameter $\lambda_a$ to identify a superior (e.g., higher accuracy) DCN architecture for a given problem. Upon identifying a superior DCN architecture, then select learning hyper-parameter $\lambda_l$, to further enhance the performance of the DCN.

Of course, hyper-parameter selection may be further optimized or enhanced based on validation error, cost (e.g., computation complexity, memory footprint), a combination thereof and other neural network and system design considerations.

Figure 8:
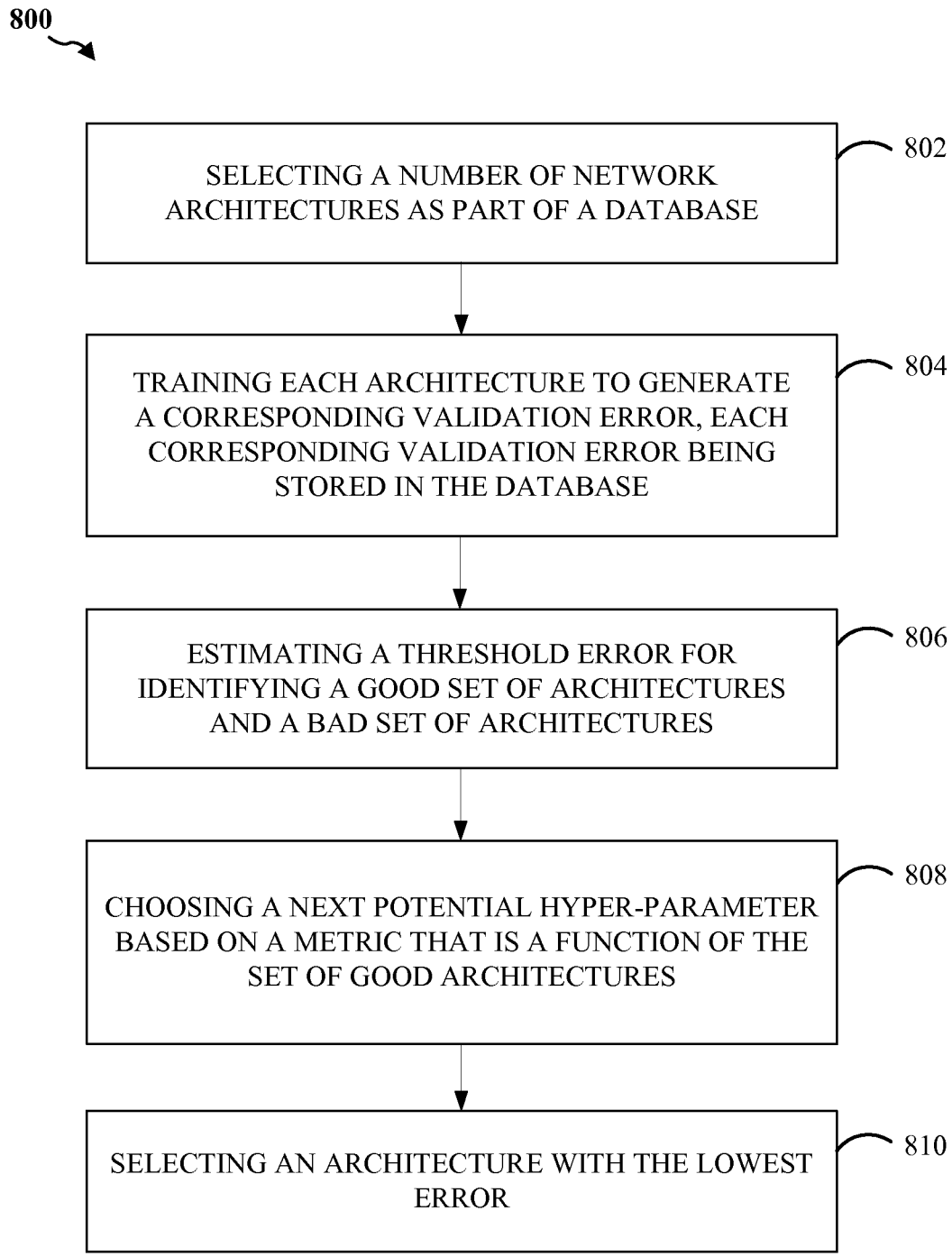
FIG. 8 illustrates a method of selecting hyper-parameters for training a deep convolutional network in accordance with aspects of the present disclosure.

FIG. 8 illustrates a method 800 for selecting hyper-parameters for training a deep convolutional network. In block 802, the process selects a number of network architectures as part of a database. In some aspects, each of the network architectures may include one or more local logistic regression layers.

In block 804, the process trains each of the network architectures to generate a corresponding validation error. The validation error may be stored in the database. In block 806, the process estimates a threshold error for identifying a good set of architectures and a bad set of architectures based on the validation errors in the database.

In block 808, the process chooses a next potential hyper-parameter, corresponding to a next architecture, based on a metric that is a function of the good architectures. In some aspects, the next potential hyper-parameter may be chosen by selecting a hyper-parameter from the good set of architectures and evaluating the next potential hyper-parameter based on a distribution of the good set of architectures, Finally, in block 810, the process selects an architecture, from among next architectures, with a lowest validation error. In some aspects, selecting the architecture includes jointly selecting architecture hyper-parameters and learning hyper-parameters.

In some aspects, the process may further select learning hyper-parameters based on the selected architecture. The process may also select additional architectures and additional learning hyper-parameters. Soft probabilities may be estimated from the additional architectures and learning hyper-parameters. The process may, in turn, identify additional hyper-parameters associated with soft probabilities based on the estimated soft probabilities. In doing so, neural model performance may be further enhanced.

In one aspect, the process may choose the next potential hyper-parameter by selecting one or more of an architecture hyper-parameter, a learning hyper-parameter and a soft probability hyper-parameter from the good set of architectures and evaluating the next potential hyper-parameter based on a distribution of the good set of architectures.

In another aspect, the process may choose the next potential hyper-parameter by selecting one or more of an architecture hyper-parameter, a learning hyper-parameter and a soft probability hyper-parameter from the good set of architectures and evaluating the next potential hyper-parameter based on a ratio of a distribution of the good set of architectures and a distribution of the bad set of architectures.

In yet another aspect, the next potential hyper-parameter may be chosen by selecting one or more of an architecture hyper-parameter, a learning hyper-parameter and a soft probability hyper-parameter from a random distribution and evaluating the next potential hyper-parameter based on a ratio of a distribution of the good set of architectures and a distribution of the bad set of architectures.

In still another aspect, the next potential hyper-parameter may be chosen by selecting one or more of an architecture hyper-parameter, a learning hyper-parameter and a soft probability hyper-parameter from a random distribution and evaluating the next potential hyper-parameter based on a distribution of the good set of architectures.

In yet still another aspect, the next potential hyper-parameter may be chosen by selecting one or more of an architecture hyper-parameter, a learning hyper-parameter and a soft probability hyper-parameter from either a good set of architectures or a random distribution, and evaluating the next potential hyper-parameter based on either a ratio of a distribution of the good set of architectures and a distribution of the bad set of architectures or the distribution of the good set of architectures based on a probability distribution.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of selecting hyper-parameters for training a deep convolutional network, comprising:
    selecting network architectures as part of a database, each of the network architectures including at least one local logistic regression layer;
    training each of the network architectures to generate a corresponding validation error that is stored in the database;
    identifying, from the network architectures, a good set of network architectures and a bad set of network architectures, each network architecture of the good set of network architectures having a validation error that is less than a validation error threshold and a memory footprint that is less than a memory threshold, and each network architecture of the bad set of network architectures having a validation error that is greater than the validation error threshold and a memory footprint that is greater than the memory threshold;
    choosing a potential hyper-parameter to define next network architectures, the potential hyper-parameter selected based at least in part on a metric that is a function of the good set of network architectures; and
    selecting a network architecture, after training each of the next network architectures to generate a validation error, with a lowest validation error.

2. The method of claim 1, in which each of the next network architectures includes at least one logistic regression layer.

3. The method of claim 1, further comprising selecting learning hyper-parameters based at least in part on the selected network architecture.

4. The method of claim 1, in which selecting the network architecture comprises jointly selecting architecture hyper-parameters and learning hyper-parameters.

5. The method of claim 1, further comprising choosing the potential hyper-parameter by selecting at least one of an architecture hyper-parameter or a learning hyper-parameter from the good set of network architectures and evaluating the potential hyper-parameter based at least in part on a distribution of the good set of network architectures.

6. The method of claim 1, further comprising choosing the potential hyper-parameter by selecting at least one of an architecture hyper-parameter or a learning hyper-parameter from the good set of network architectures and evaluating the potential hyper-parameter based at least in part on a ratio of a distribution of the good set of network architectures and a distribution of the bad set of network architectures.

7. The method of claim 1, further comprising choosing the potential hyper-parameter by selecting at least one of an architecture hyper-parameter or a learning hyper-parameter from a random distribution and evaluating the potential hyper-parameter based at least in part on a ratio of a distribution of the good set of network architectures and a distribution of the bad set of network architectures.

8. The method of claim 1, further comprising choosing the potential hyper-parameter by selecting at least one of an architecture hyper-parameter or a learning hyper-parameter from a random distribution and evaluating the potential hyper-parameter based at least in part on a distribution of the good set of network architectures.

9. The method of claim 1, further comprising choosing the potential hyper-parameter by selecting at least one of an architecture hyper-parameter or a learning hyper-parameter from either the good set of network architectures or a random distribution, and evaluating the potential hyper-parameter based at least in part on either a ratio of a distribution of the good set of network architectures and a distribution of the bad set of network architectures or the distribution of the good set of network architectures based at least in part on a probability distribution.

10. An apparatus for selecting hyper-parameters for training a deep convolutional network, comprising:
a memory; and
at least one processor coupled to the memory and configured:
to select network architectures as part of a database, each of the network architectures including at least one local logistic regression layer;
to train each of the network architectures to generate a corresponding validation error that is stored in the database;
to identify, from the network architectures, a good set of network architectures and a bad set of network architectures, each network architecture of the good set of network architectures having a validation error that is less than a validation error threshold and a memory footprint that is less than a memory threshold, and each network architecture of the bad set of network architectures having a validation error that is greater than the validation error threshold and a memory footprint that is greater than the memory threshold;
to choose a potential hyper-parameter to define next network architectures, the potential hyper-parameter selected based at least in part on a metric that is a function of the good set of network architectures; and
to select a network architecture, after training each of the next network architectures to generate a validation error, with a lowest validation error.

11. The apparatus of claim 10, in which each of the next network architectures includes at least one logistic regression layer.

12. The apparatus of claim 10, in which the at least one processor is further configured to select learning hyper-parameters based at least in part on the selected network architecture.

13. The apparatus of claim 10, in which the at least one processor is further configured to select the network architecture by jointly selecting architecture hyper-parameters and learning hyper-parameters.

14. The apparatus of claim 10, in which the at least one processor is further configured to choose the potential hyper-parameter by selecting at least one of an architecture hyper-parameter or a learning hyper-parameter from the good set of network architectures and evaluating the potential hyper-parameter based at least in part on a distribution of the good set of network architectures.

15. The apparatus of claim 10, in which the at least one processor is further configured to choose the potential hyper-parameter by selecting at least one of an architecture hyper-parameter or a learning hyper-parameter from the good set of network architectures and evaluating the potential hyper-parameter based at least in part on a ratio of a distribution of the good set of network architectures and a distribution of the bad set of network architectures.

16. The apparatus of claim 10, in which the at least one processor is further configured to choose the potential hyper-parameter by selecting at least one of an architecture hyper-parameter or a learning hyper-parameter from a random distribution and evaluating the potential hyper-parameter based at least in part on a ratio of a distribution of the good set of network architectures and a distribution of the bad set of network architectures.

17. The apparatus of claim 10, in which the at least one processor is further configured to choose the potential hyper-parameter by selecting at least one of an architecture hyper-parameter or a learning hyper-parameter from a random distribution and evaluating the potential hyper-parameter based at least in part on a distribution of the good set of network architectures.

18. The apparatus of claim 10, in which the at least one processor is further configured to choose the potential hyper-parameter by selecting at least one of an architecture hyper-parameter or a learning hyper-parameter from either the good set of network architectures or a random distribution, and evaluating the potential hyper-parameter based at least in part on either a ratio of a distribution of the good set of network architectures and a distribution of the bad set of network architectures or the distribution of the good set of network architectures based at least in part on a probability distribution.

19. An apparatus for selecting hyper-parameters for training a deep convolutional network, comprising:
means for selecting network architectures as part of a database, each of the network architectures including at least one local logistic regression layer;

means for training each of the network architectures to generate a corresponding validation error that is stored in the database;

means for identifying, from the network architectures, a good set of network architectures and a bad set of network architectures, each network architecture of the good set of network architectures having a validation error that is less than a validation error threshold and a memory footprint that is less than a memory threshold, and each network architecture of the bad set of network architectures having a validation error that is greater than the validation error threshold and a memory footprint that is greater than the memory threshold;

means for choosing a potential hyper-parameter to define next network architectures, the potential hyper-parameter selected based at least in part on a metric that is a function of the good set of network architectures; and means for selecting a network architecture, after training each of the next network architectures to generate a validation error, with a lowest validation error.

20. A non-transitory computer-readable medium having encoded thereon program code for selecting hyper-parameters for training a deep convolutional network, the program code being executed by a processor and comprising:

program code to select network architectures as part of a database, each of the network architectures including at least one local logistic regression layer;

program code to train each of the network architectures to generate a corresponding validation error that is stored in the database;

program code to identify, from the network architectures, a good set of network architectures and a bad set of network architectures, each network architecture of the good set of network architectures having a validation error that is less than a validation error threshold and a memory footprint that is less than a memory threshold, and each network architecture of the bad set of network architectures having a validation error that is greater than the validation error threshold and a memory footprint that is greater than the memory threshold;

program code to choose a potential hyper-parameter to define next network architectures, the potential hyper-parameter selected based at least in part on a metric that is a function of the good set of network architectures; and program code to select a network architecture, after training each of the next network architectures to generate a validation error, with a lowest validation error.

* * * * *